United States Patent [19]

Takagi et al.

[11] Patent Number: 4,478,772

[45] Date of Patent: Oct. 23, 1984

[54] PROCESS FOR PREPARING CAST FILM OF THERMOPLASTIC RESIN

[75] Inventors: Norio Takagi, Zama; Hiroshi Aoyagi, Iwakuni, both of Japan

[73] Assignee: Teijin Limited, Osaka, Japan

[21] Appl. No.: 487,701

[22] Filed: Apr. 21, 1983

[30] Foreign Application Priority Data

Apr. 21, 1982 [JP] Japan .................................. 57-65427

[51] Int. Cl.³ .............................................. B29D 7/02
[52] U.S. Cl. ..................................... 264/22; 264/216; 425/174.8 E; 425/224
[58] Field of Search ............................... 264/22, 216; 425/174.8 E, 223, 224, 66

[56] References Cited

U.S. PATENT DOCUMENTS 3,213,172 10/1965 Hoelzer ................................ 264/216
3,660,549 5/1972 Hawkins ............................. 264/216
4,038,354 7/1977 Remmington et al. ............. 264/102

FOREIGN PATENT DOCUMENTS 53-45349 12/1978 Japan ................................. 264/216
1302642 1/1973 United Kingdom .

Primary Examiner—James B. Lowe
Attorney, Agent, or Firm—Wenderoth, Lind & Ponack

[57] ABSTRACT

A process for preparing a thermoplastic resin film by extruding a molten thermoplastic film-forming resin in the form of a continuous molten film onto an electrically grounded moving quenching surface, passing the molten film in proximity to but out of contact with at least one electrode which imparts an electrostatic charge to the film across its full width and withdrawing a solidified film thus formed from said quenching surface; which process comprises extruding the molten film onto a quenching surface characterized by having a channel-like microcracked structure.

3 Claims, 8 Drawing Figures

Fig. 1-a
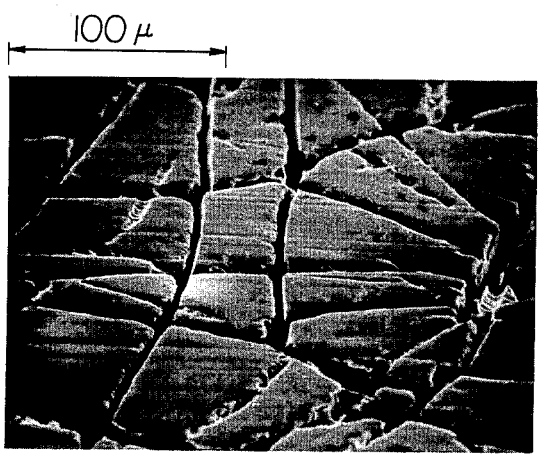
Fig. 1-b
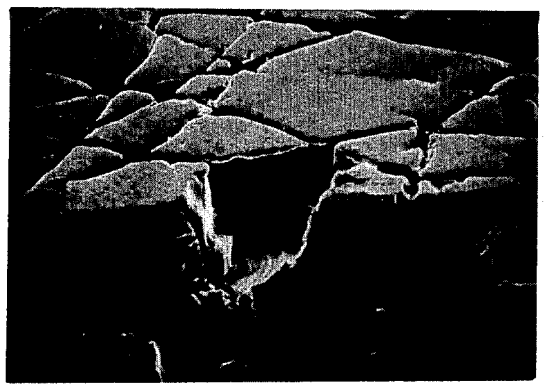

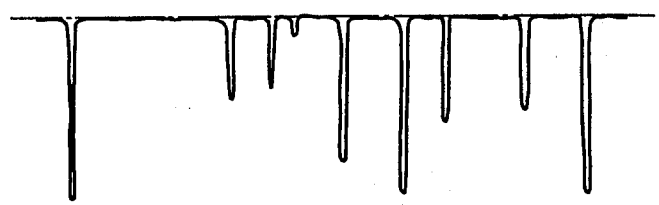
Fig. 1-c
Fig. 2-c
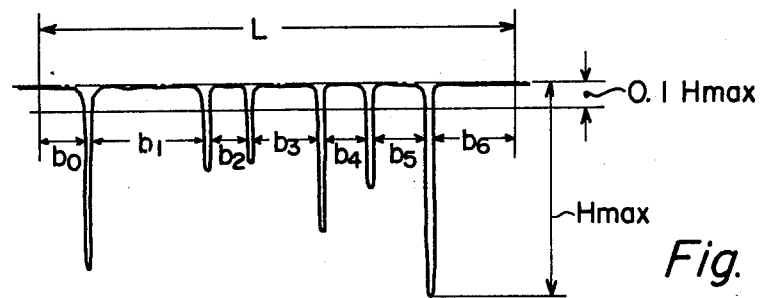
Fig. 3
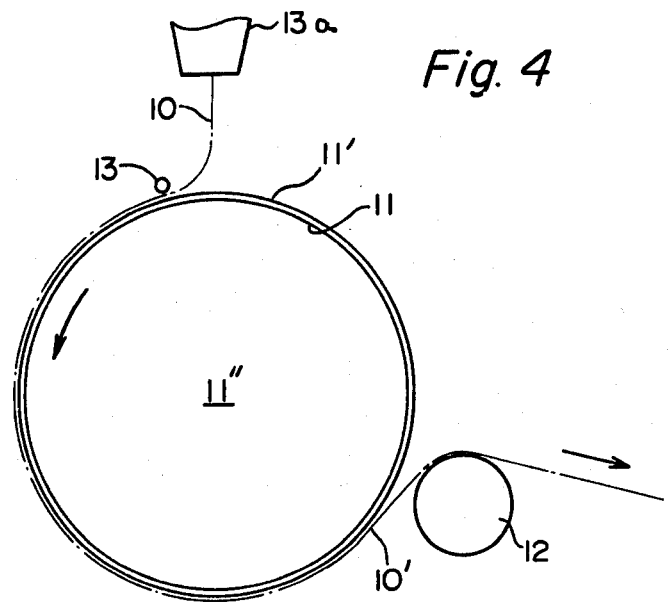
Fig. 4

Fig. 2-a
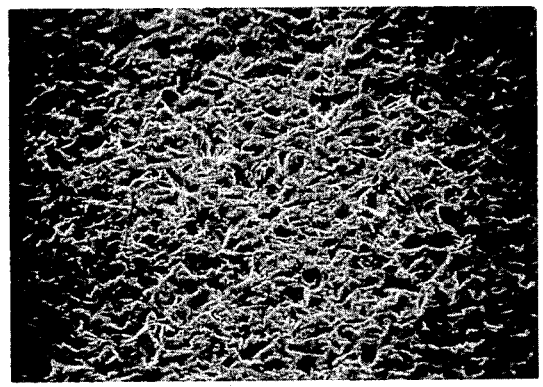
Fig. 2-b
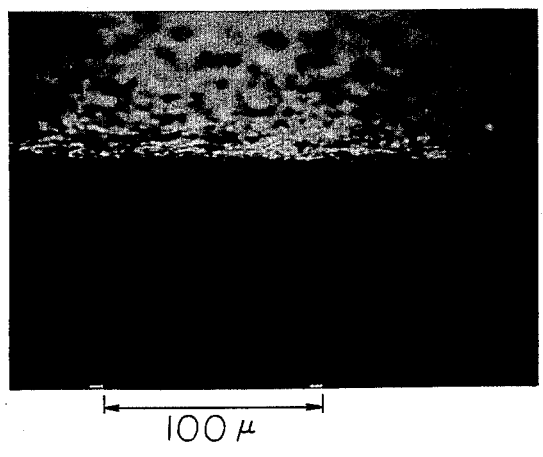
$100\mu$

PROCESS FOR PREPARING CAST FILM OF THERMOPLASTIC RESIN

BACKGROUND OF THE INVENTION

1. Field of the Invention

This invention relates to an improved process for preparing a cast film of a thermoplastic resin by an electrostatic pinning technique. According to this process, a cast film of a thermoplastic resin having excellent thickness uniformity and surface smoothness can be easily produced on an industrial scale at high speeds without the undesirable pinner bubble problem and without the trouble of replication of the profile of a quenching surface onto the cast film.

More specifically, this invention pertains to a process for preparing a thermoplastic resin film by extruding a molten thermoplastic film-forming resin in the form of a continuous molten film onto an electrically grounded moving quenching surface, passing the molten film in proximity to but out of contact with at least one electrode which imparts an electrostatic charge to the film across its full width, and withdrawing a solidified film thus formed from said quenching surface.

2. Description of the Prior Art

U.S. Pat. No. 3,223,757 (British Pat. No. 911,528) or British Pat. No. 1,310,609 discloses a process for preparing a thermoplastic resin film by extruding a molten thermoplastic film-forming resin in the form of a continuous molten film onto an electrically grounded moving quenching surface, passing the molten film in proximity to but out of contact with at least one electrode which imparts an electrostatic charge to the film across its full width, and withdrawing a solidified film thus formed from said quenching surface. When the above process using an electrostatic pinning means is operated at a low casting speed, there can be formed a thermoplastic resin film having good thickness uniformity and surface smoothness. If, however, the process is practiced at a casting speed satisfactory for industrial operation, the pinner bubble problem as described, for example, in British Pat. No. 1,302,642 arises. Specifically, the amount of the electrostatic charge per unit area of the quenching film decreases unduly as the casting speed increases. As a result, the electrostatic force of bringing the film into intimate adhesion to the quenching surface becomes insufficient, and air comes between the film and the quenching surface and reduces the uniformity of the quenching effect. In addition, this air produces traces of minute bubbles on the film. The number and size of these bubbles tend to increase as the casting speed increases, and this constitutes a drawback.

In an attempt to overcome this problem, British Pat. No. 1,302,642 proposed an improvement in the aforesaid process, in which the molten film is extruded onto a quenching surface having a surface roughness of at least 15 microinches, r.m.s., and a multiplicity of interconnecting pits. The British patent states that surface roughness in excess of 60 microinches, r.m.s., results in surface irregularities in the finished film which are equal to or greater than the defects caused by the pinner bubbles experienced when using electrostatic pinning with a smooth quenching surface. Furthermore, British Pat. No. 1,302,642 teaches that the quenching surface used in the process of this patent can be prepared by blasting a smooth metallic quenching surface with hard particulate material such as sand, glass beads, shot or aluminum oxide grit having a general particle size of about from 80 to 320 mesh.

Investigations of the present inventors have shown that the cast film of thermoplastic resin obtained by the process of the British patent still has problems to be solved.

For example, base films of high-density magnetic recording media, or optical materials such as photographic materials require films having a high level of thickness uniformity and surface smoothness which are free from fine surface irregularities (orange peel) and do not cause trouble in packaging materials or electrical insulating materials. However, with thermoplastic resin films obtained by electrostatic pinning using the quenching surface disclosed in the British patent which has a surface roughness of at least 15 microinches, r.m.s., and a multiplicity of interconnecting pits, and which is prepared by blasting a smooth metallic quenching surface with hard particulate material, it is difficult to avoid satisfactorily the occurrence of microscopic surface irregularities (orange peel) resulting from replication of the profile of the blasted surface onto the films. It has been found that, for example, for use as high-density magnetic recording media optical materials, these irregularities cause technical trouble. On the other hand, if the surface roughness of the blasted surface is reduced to below 15 microinches, r.m.s., this trouble will be alleviated, but as a matter of course, the pinner bubble problem arises. To avoid this problem, there is no way but to decrease the casting speed, and industrially satisfactory casting speeds cannot be employed.

In the process disclosed in the British patent for preparing a cast film of a thermoplastic resin by electrostatic pinning by using a quenching surface having a surface roughness of at least 15 microinches, r.m.s., and a multiplicity of interconnecting pits prepared by blasting a smooth metallic quenching surface with hard particulate material, the casting speed is at most about 80 m/min. and higher speeds cannot actually be employed because of the pinner bubble problem. In addition, it has been found that even such low casting speeds cannot be maintained for a long period of time, but decrease with time. In the above process, low-molecular-weight compounds contained in the molten thermoplastic film-forming resin tend to adhere to, and build up on, the quenching surface. Presumably because of the blocking of the interconnecting pits by these low-molecular-weight compounds, the pinner bubble problem becomes outstanding with time, and the desired operating speed cannot be maintained. Furthermore, as a result of such blocking, bubbles present between the quenching surface and the molten thermoplastic film-forming resin in the form of a continuous molten film in contact therewith increase, and the uniformity of the quenching effect is reduced.

SUMMARY OF THE INVENTION

The present inventors made extensive investigations in order to provide a cast film of a thermoplastic resin by electrostatic pinning by overcoming the technical problems of the prior art. These investigations have led to the discovery that the above technical problems can be solved by using a quenching surface characterized by having a channel-type microcracked structure which differs from the surface structural characteristic of the blasted surface in the aforesaid British patent. Further, even by operating the moving quenching surface at a speed of as high as about 100 m/min. or more, a cast film of a thermoplastic resin having excellent thickness uniformity and surface smoothness which is fully satisfactory for use as optical materials and high-density magnetic recording media can be easily produced on an industrial scale without the undesirable pinner bubble problem and without the trouble of replication of the problem of the quenching surface onto the cast film.

It has also been found that the blocking of the interconnecting pits as in the aforesaid prior art can be avoided, and the trouble of decreasing casting speeds with time can conveniently be removed.

BRIEF DESCRIPTION OF THE DRAWINGS

FIGS. 1-a and 1-b are microphotographs of the surface and section, respectively, of a quenching roll having a surface with a microcracked structure for use in the present invention.

FIG. 1-c illustrates, in section, the characteristics of the microcracked structure used in the invention.

FIGS. 2-a, 2-b and 2-c illustrates prior art surfaces, as a comparison with FIGS. 1-a, 1-b and 1c, respectively.

FIG. 3 is useful in determining the profile-bearing rates as an expression of the surface roughness of the quenching surface used in the invention.

FIG. 4 illustrates an arrangement of a known process for preparing a thermoplastic resin film by electrostatic pinning.

DESCRIPTION OF THE PREFERRED EMBODIMENTS

According to the investigations of the present inventors, the blasted surface of the prior art has such a surface profile that many relatively sharp projections are distributed at random throughout the entire surface and each of the interconnecting pits has a considerably broad opening and a considerably small depth. In contrast, the surface characterized by having a channel-like microcracked structure in accordance with the present invention has a surface profile such that a number of interconnecting channels in a network structure are distributed at random over the entire flat surface substantially free from sharp projections as in the prior art. Each of the channels has a narrow opening and a much larger depth than the blasted surface. Moreover, the quenching surface used in this invention frequently has such a structure that channels existing below the surface and not perceptible from outside communicate with each other and with the interconnecting channels appearing on the surface. These structural characteristics will be described in more detail hereinafter with reference to the accompanying drawings.

In the prior art, the moving quenching surface can be operated at speeds of up to 80 m/min. at the highest. By contrast, owing to the aforesaid marked difference in surface structural characteristics, the process of the present invention makes it possible to obtain a cast film of a thermoplastic resin having excellent thickness uniformity and surface smoothness which is satisfactory also in optical applications at high practical operating speeds of 100 m/min. or more. Furthermore, in the prior art, the operating speed must be decreased with time because of the blocking of the interconnecting pits with the lapse of time. In contrast, in the process of this invention, no channel blocking occurs which may substantially hamper high-speed operation, and high-speed operation can be continued stably over long periods of time.

It is an object of this invention therefore to provide an improved process for preparing a thermoplastic resin film by electrostatic pinning.

This and other objects of the invention along with its advantages will become more apparent from the following description.

The process for preparing a thermoplastic resin film by an electrostatic pinning technique has been well known (U.S. Pat. No. 3,223,757, British Pat. No. 911,528, British Pat. No. 978,302, and British Pat. No. 1,302,642).

According to this invention, there is provided a process for preparing a thermoplastic resin film by extruding a molten thermoplastic film-forming resin in the form of a continuous molten film onto an electrically grounded moving quenching surface, passing the molten film in proximity to but out of contact with at least one electrode which imparts an electrostatic charge to the film across its full width, and withdrawing a solidified film thus formed from said quenching surface; which process comprises extruding the molten film onto a quenching surface characterized by having a channel-type microcracked structure.

The blasted surface differs from the surface having a channel-type microcracked structure (or microcracked structure) in respect to the method of formation and structural characteristics.

The blasted surface, as described in British Pat. No. 1,302,642, is prepared by blasting a smooth metallic surface with hard particulate material such as sand, glass beads, shot or aluminum oxide grit. The particulate material can be blasted against the surface by conventional blasting techniques using compressed air and propelling a stream of the particulate material against the surface.

The surface having a microcracked structure used in the present invention can be prepared by conventional microcracked plating techniques such as microcracked chrome plating or microcracked nickel plating. Such microcracked plating techniques have previously been used, for example, to form a plated layer for keeping a lubricant oil on the surface of an engine cylinder of an internal combustion engine in order to prevent its seizure. A method for preparing such a surface is well known, and, for example, is based on the principle that when a chrome-plated layer formed on a substrate, which contains an internal stress or an internal defect, is subsequently etched chemically or electrochemically, a difference in dissolution speed occurs in the plated layer, or the internal stress is released, thereby forming cracks in the plated layer. As desired, the treated surface is then polished. Basically, the quenching surface so prepared has a channel-type microcracked structure in which a network of interconnecting cracks (or channels) is randomly formed on a relatively smooth flat surface.

Now, the markedly different surface structural characteristics of the blasted surface and the surface having a channel-type microcracked structure will be described in detail with reference to the accompanying drawings.

FIG. 1-a is a microphotograph, taken through a scanning electron microscope, of the surface of a sample cut away from a quenching roll having a surface with a microcracked structure made by applying a chrome plating to an iron substrate by using a conventional microcracked chrome plating technique and then electrolytically etching the chrome plated layer.

FIG. 1-b is a similar microphotograph cut away in the sectional direction.

FIG. 1-c is a sectional model view for illustrating the structural characteristics of the aforesaid surface having a channel-type microcracked structure used in the process of this invention.

FIG. 2-a is a microphotograph, similar to FIG. 1-a, of one example of a quenching roll having a blasted surface structure as in the prior art.

FIG. 2-b is a similar microphotograph to that shown in FIG. 2-a except that it is cut away in the sectional direction.

FIG. 2-c is a sectional model view for illustrating the structural characteristics of the aforesaid prior art surface prepared by blasting a smooth metallic quenching surface with hard particulate material.

As shown in FIGS. 2-a, 2-b and 2-c, the blasted surface utilized in the prior art has such a surface profile that a number of relatively sharp projections are distributed at random throughout the entire surface. Each of the interconnecting pits has a considerably broad opening and a considerably small depth. As shown in FIG. 2-c, the heights of these projections are non-uniform. Even if the blasted surface is polished to the level shown by the chain line in FIG. 2-c so as to reduce the overall surface roughness to a preferred range, it cannot assume the surface condition shown in FIG. 1-c.

In contrast, the surface having a channel-type microcracked structure utilized in the process of this invention, as shown in FIGS. 1-a, 1-b and 1-c, does not substantially have sharp projections as in the blasted surface, but has such a surface profile that a number of interconnecting channels in a network structure are distributed randomly throughout the entire flat surface. Each of the channels has a narrow opening and a large depth. At first sight, the surface profile of the quenching surface utilized in this invention can be clearly distinguished from that of the prior art blasted surface. In addition, as shown in the cut-away view of FIG. 1-b, the quenching surface used in the present invention frequently has such a structure that channels existing below the surface and not perceptible from outside communicate with each other and with the interconnecting channels appearing on the surface.

Furthermore, as shown in FIGS. 1-a, 1-b and 1-c, each of the channel cracks in the quenching surface utilized in the present invention extends deep from a narrow crack opening on the surface in a direction substantially at right angles to the surface with a nearly uniform width (for example, it extends to a depth of several microns to several hundred microns from the surface). In contrast, in the blasted surface, each of the pits is of a conical shape with a broadened opening, as shown in FIGS. 2-a, 2-b and 2-c. In this regard, the surface profile of the two differ markedly from each other.

As stated hereinabove, in the production of a cast film of a thermoplastic resin by an electrostatic pinning technique, the prior art quenching surface having blasted surface characteristics quite differs in surface characteristics from the quenching surface utilized in the present invention which has a channel-type microcracked structure.

In the quenching surface utilized in the present invention, at least 5, preferably at least 10, especially at least 50, for example up to 2,000, microcracks exist per 10 mm (actual length) when they are measured in an arbitrary direction by using a microphotograph of the quenching surface. At least 70% of the microcracks have a channel opening width of at least 0.1 μm, preferably at least 1 μm, for example, not more than 300 μm, more preferably not more than 100 μm, optimally 2 to 50 μm. The total sum of the opening widths of the entire microcracks per 10 mm is not more than 5 mm, preferably not more than 3 mm, especially 100 μm to 2 mm.

The quenching surface having a channel-type microcracked structure, unlike the blasted surface, has microcracks with a depth exceeding that which can be measured by a conventional needle contacting-type roughness tester, and the surface among the microcracks is relatively flat. It is proper therefore to express the surface roughness of the quenching surface utilized in this invention by $t_{ap}$ (profile-bearing rate; profiltraganteil). $t_{ap}$ is defined by DIN (German Industrial Standards) 4762 (February 1952). The quenching surface having a channel-type microcracked structure utilized in this invention preferably has a $t_{ap}$ of at least about 30%, especially about 40% to about 90%. In contrast, the prior art quenching surface having blasted surface characteristics has a $t_{ap}$ of about 10% at the highest. Even if it is polished to reduce the overall surface roughness to a preferred range, its $t_{ap}$ increases only to about 20%. If it is polished to a greater extent, the surface roughness structure having a multiplicity of interconnecting pits will be substantially lost.

The profile-bearing rate ($t_{ap}$) is determined and calculated in accordance with the following equation (see FIG. 3).

$$t_{ap} = \frac{L_f}{L} \times 100(\%)$$

In the above equation, L is a length (for example, 10 mm) of measurement when the surface roughness of the quenching surface is measured at an arbitrary point in an arbitrary direction by a roughness tester having a pick-up head with a diameter of 3 microns. Let the depth of the deepest pit in the aforesaid measurement of surface roughness be Hmax, $L_f$ is the sum total of the lengths ($b_0$, $b_1$, $b_2$, $b_3$, ... $b_n$) of the surface roughness curve which are cut by a straight line (f) drawn parallel to a relatively flat surface (e) at a depth of 0.1 Hmax from the surface (e) (in the example shown in FIG. 3, $L_f = b_0 + b_1 + b_3 + b_4 + b_5 + b_6$).

According to this invention, it is necessary to extrude a molten thermoplastic film-forming resin in the form of a continuous molten film onto the aforesaid quenching surface having a channel-type microcracked structure, preferably an electrically grounded moving quenching surface having a profile-bearing rate ($t_{ap}$) of at least about 30%, especially about 40% to about 99%. Otherwise, the process of this invention can be carried out by utilizing the known process for preparing a thermoplastic resin film by electrostatic pinning as described hereinabove.

FIG. 4 is a rough arrangement showing one example of the known process.

A molten thermoplastic film-forming resin is extruded in the form of a continuous molten film 10 from an extrusion die 13a onto an electrically grounded (not shown) moving quenching surface 11. In this example, the electrically grounded moving quenching surface is in the form of a rotating drum. But it may be in any other form such as a rotating belt. In the above embodiment, the quenching surface 11 is adapted to be cooled by passing a suitable coolant such as water and ethylene glycol through the inside 11" of the rotating drum. It may also be a quenching surface cooled by other cooling means, for example by blowing cooled air (gas) to that surface of the rotating drum which is opposite to the drum surface with which the film makes contact, to increase the cooling effect.

In the process of this invention, the surface 11' of the quenching surface 11 has the channel-type microcracked structure described in detail hereinabove.

The molten film 10 is passed in proximity to but out of contact with at least one electrode 13 which imparts an electrostatic charge to the film across its full width and the resulting solidified film 10' is withdrawn from the quenching surface having a surface 11' with a channel-type microcracked structure. In this embodiment, the withdrawal of the solidified film is effected by utilizing take-off rolls 12. But other means can also be utilized. For example, a suction device may be disposed at the back of the molten steel in order to suck air entrapped between the molten sheet and the quenching drum. A device for blowing a gas such as oxygen, nitrogen or air may be disposed in order to blow away low-molecular-weight compounds floating around the electrode and increase the adhesion of the molten sheet. Furthermore, in order to maintain the electrode in a high-temperature atmosphere, a heating device such as an infrared heater may be provided near the electrode.

Subsequently, the solidified film 10' is stretched by any known method, for example biaxially stretching it to form a stretched film. If further desired, it may be subjected to heat-treatment and other known after-treatments.

The quenching surface having a channel-type microcracked structure utilized in this invention can be formed by utilizing known methods. For example, the quenching surface can be prepared by conventional microcracked plating techniques such as microcracked chromium plating, microcracked nickel plating, etc., for example by applying a chrome plating, nickel plating, chrome-nickel plating to a suitable metallic substrate such as iron, stainless steel and aluminum and thereafter, chemically or electrochemically etching the plated surface. It can also be prepared by selecting the composition of the chrome plating bath and the chrome plating conditions. The microcracked plating techniques themselves are not part of this invention, and plated articles obtained by such techniques are commercially available. The microcracked plating techniques are described, for example, in Van der Horst, J. M. A., 1962-Oct; "Manual of Metal Surface Techniques", edited by Society of Metal Surface Technique, (1976); and Murakami et al., "Practical Aspect of Metal Plating" (1978).

The surface roughness of the flat portion of the microcracked structure, as determined by a needle contacting-type roughness tester, may be 0.5S to that of a mirror surface. But it may have a rough surface of 1S to about 2S so long as it does not adversely affect the surface characteristics of the film. By maintaining a low surface temperature of the quenching drum, replication of the quenching surface can be reduced. Furthermore, after the chrome plated surface is electrochemically etched to form a cracked structure, it is the general practice to polish the flat portion lightly so as to smoothen it. But sometimes, it can be used as a quenching surface without polishing.

In order to further reduce the effect of replication of cracks onto the surface of the film while retaining the effect of the high-speed of the quenching drum, there can be used a cracked drum having a bag-like sectional shape in which the openings of the crack channels at the drum surface are made narrow while their internal shape is kept unchanged. By enlarging the flat portion of the quenching surface while maintaining the effect of discharging the trapped air, it is possible to reduce replication and produce a film of a higher quality at high speeds.

The bag-like microcrack can be produced, for example, by buffing the microcracked surface with a cloth, etc. Bag-like microcracks produced by buffing are shown in scanning electron microphotographs (FIGS. 1-a and 1-b) of the drum section, and it is seen that the flat portion on the drum surface projects toward the opening portions of the cracks. Another method of producing such bag-like microcracks is to plate the cracked surface again.

In the process of this invention, any thermoplastic film-forming resin can be utilized. Examples include polyesters and copolyesters, such as polyethylene terephthalate or polyethylene naphthalate; polyolefins and copolyolefins, such as polypropylene; vinyl polymers or copolymers, such as polystyrene; polyamides or copolyamides, such as nylon 6; and polycarbonates and copolycarbonates. The process of this invention can especially suitably be applied to polyesters and copolyesters.

In the process of this invention, there is used a quenching surface having a channel-type microcracked structure quite different from the prior art quenching surface having the structural characteristics of a blasted surface. As already stated in detail, in the quenching surface having a channel-type microcracked structure, a network of interconnecting cracks or channels is distributed at random all over the surface. The surface among the cracks or channels forms a relatively smooth surface. The interconnecting cracks or channels extend relatively deep in the thickness direction of the quenching surface. Owing to these characteristics of the channel-type microcracked structure, air which can flow into the contacting space between the extruded film and the quenching surface is discharged rapidly and efficiently through the interconnecting cracks or channels, and the casting speed, which is only about 80 m/min. at the highest in the prior art, can be increased to, for example, as high as 100 m/min. or more without causing the pinner bubble problem.

Furthermore, because of the aforesaid structural characteristics, the trouble of blocking of the quenching surface by the adhesion of low-molecular-weight compounds contained in the molten thermoplastic film-forming resin can be avoided. Also, while in the prior art even the casting speed of about 80 m/min., which is the highest possible one, cannot be maintained for a long period of time, the present invention permits long-term operation at a speed of, for example, as high as 100 m/min. or more.

In addition, replication of the profile of the quenching surface on the cast film can be avoided, and cast films having high levels of thickness uniformity and surface smoothness which are satisfactory in high-density magnetic recording media and optical materials can be easily produced on an industrial scale.

The following examples illustrate the process of this invention more specifically.

The maximum casting speed, blocking resistance and surface smoothness (replication of the profile of the quenching surface onto the cast film) were measured and evaluated by the following methods.

(a) Maximum casting speed

A cast film was produced by varying the casting speed. The maximum speed (m/min.) at which an unstretched film could be stably produced over one hour without the formation of pinner bubbles was determined.

(b) Blocking resistance

The time (hours) during which an unstretched film could be produced at 90% of the maximum casting speed measured in accordance with (a) above without the formation of pinner bubbles was determined.

(c) Surface smoothness

The unstretched film obtained in (a) above was stretched to 3.6 times in the longitudinal direction (machine direction) and to 3.9 times in the transverse direction. The surface pattern (orange peel) of the resulting biaxially stretched film was observed with the naked eye, and evaluated on the following scale. The following table also shows the correspondence of these orange peel evaluations to the surface roughness of the unstretched film.

| Grade | Orange peel (stretch film) | Surface roughness of the drum-contacting surface of the unstretched film [μm (CLA)] |
|---|---|---|
| 1 | Not perceptible | below 0.02 |
| 2 | Negligible degree | 0.02 to below 0.03 |
| 3 | Very slight degree | 0.03 to below 0.04 |
| 4 | Slight degree | 0.04 to below 0.05 |
| 5 | Medium degree | 0.05 to below 0.06 |
| 6 | Hight degree | 0.06 to below 0.07 |
| 7 | Heavy | at least 0.07 |

EXAMPLES 1 AND COMPARATIVE EXAMPLE 1 AND 2

A quenching drum was used which had a quenching surface composed of a microcracked chromium plating layer formed by electrolytically etching a chromium plated layer having a thickness of 150 μm and then light polishing its surface. It had a channel-type microcracked surface structure in which there were 120 intersecting points of cracks on an average per 10 mm of straight line, each of the cracks had an opening width of 8 μm on an average per 10 mm of straight line and the total of the opening widths per 10 mm was 0.66 mm. Its surface roughness was 0.33 μm (CLA). The quenching surface had a profile-bearing rate ($t_{ap}$) of 75%.

A film of polyethylene terephthalate was produced by using an apparatus of the type shown in FIG. 4 which had the aforesaid quenching drum. Polyethylene terephthalate was melted and extruded in the form of a continuous molten film having a thickness of 180 μm onto an electrically grounded moving quenching surface of the drum having a surface temperature of 40° C. The molten film was passed in proximity to but out of contact with one wire electrode which imparts an electrostatic charge to the film across its full width. The resulting solidified film was withdrawn from the quenching surface of the drum. The maximum casting speed was 100 m/min.

The blocking resistance was more than 50 hours. The surface roughness of the unstretched film was 0.019. The surface smoothness of the stretched film was rated as grade 1. This film fully met the requirements for base films of video tapes.

For comparison, a polyethylene terephthalate film was produced in the same way as above except that a quenching drum having a mirror surface finished chrome plated quenching surface was used instead of the aforesaid quenching surface having a microcracked structure (Comparative Example 1). The maximum casting speed was 45 m/min.

For further comparison, a polyethylene terephthalate film was produced in the same way as above except that a quenching drum having a blasted quenching surface obtained by blasting a mirror-finished chrome plated surface with sand to form a surface having a roughness of 0.35 μm (CLA) and then lightly polishing the surface to a roughness of 0.33 μm was used instead of the aforesaid quenching surface having a channel-like microcracked structure (Comparative Example 2). The maximum casting speed was 80 m/min., and the blocking resistance was 22 hours. The surface roughness of the unstretched film was 0.052 μm. The surface smoothness of the stretched film was grade 5. Since this film had poor surface smoothness, it did not meet the requirements of base films of video tapes.

EXAMPLE 2

A quenching drum was used which had a quenching surface composed of a microcracked chromium plated layer obtained by chemically etching a chrome plated layer polished smooth to a thickness of 100 μm. The quenching surface had a channel-type microcracked structure in which per 10 mm of straight line, the number of intersecting points of the cracks was about 600, each crack had an average opening width of 0.3 μm, the total opening widths of the cracks was 180 μm, and it had a surface roughness of 0.07 μm (CLA). The quenching surface had a profile-bearing rate ($t_{ap}$) of 99%.

A polyethylene terephthalate film was produced in the same way as in Example 1 except that the aforesaid quenching drum was used, and a molten polyethylene terephthalate film in the form of a continuous molten film having a thickness of 200 μm was extruded.

The maximum casting speed was 90 m/min. The blocking resistance was 48 hours, and the surface smoothness of the unstretched film was grade 1.

What is claimed is:

1. A process for preparing a thermoplastic resin film by extruding a molten thermoplastic film-forming resin in the form of a continuous molten film onto an electrically grounded moving quenching surface, passing the molten film in proximity to but out of contact with at least one electrode which imparts an electrostatic charge to the film across its full width, and withdrawing a solidified film thus formed from said quenching surface; which process comprises extruding the molten film onto a quenching surface having a channel-like microcracked structure.

2. The process of claim 1 wherein the quenching surface has a profile-bearing rate of at least about 30%.

3. The process of claim 1 wherein the quenching surface has a profile-bearing rate of about 40% to about 99%.

* * * * *